United States Patent Office 3,318,878
Patented May 9, 1967

3,318,878
NITROTHIOPHENE COMPOUNDS
George L. Dunn, Wayne, Pa., assignor to Smith Kline &
French Laboratories, Philadelphia, Pa., a corporation
of Pennsylvania
No Drawing. Filed Apr. 14, 1966, Ser. No. 542,460
2 Claims. (Cl. 260—240)

This invention relates to nitrothiophene compounds having antiparasitic and antibacterial activity in conjunction with reduced toxicity relative to known compounds. In particular, the invention relates to 3-(5-nitro-2-thenylideneamino)-5-tert-aminomethyl-2-oxazolidinones.

The compounds of the invention are 3-(5-nitro-2-thenylideneamino)-2-oxazolidinones substituted at the 5- position of the oxazolidine ring with a tert-aminomethyl group. They are represented by the following structural formula:

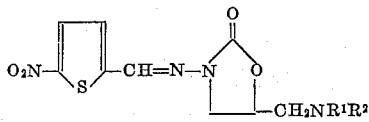

where $R^1$ and $R^2$ are lower alkyl, or, together with the nitrogen atom to which they are attached, a heterocyclic ring.

The various tert-amino groups which are within the scope of the invention include dimethylamino, diethylamino, dipropylamino, dibutylamino, methylethylamino, methylpropylamino, morpholino, piperidino, pyrrolidino, hexamethyleneimino, heptamethyleneimino, 4-methylpiperazino, and 3-azabicyclo[3.2.2]non-3-yl. The term "lower alkyl" when used to define the compounds of the invention is intended to represent those alkyl groups having up to about 5 carbon atoms therein.

The compounds are prepared by condensing 5-nitro-2-thiophenecarboxaldehyde with the particular 3-amino-5-tert-aminomethyl-2-oxazolidinone. The latter compounds are disclosed in U.S. Patent 2,802,002 or are prepared by methods described therein. The two reactants are allowed to stand at room temperature for a short period of time in a solvent such as alcohol and the crude product removed conveniently by filtration. The compound is purified by conventional acid-base extraction and recrystallized from solvents such as acetonitrile and ethanol or mixtures thereof.

The compounds of the invention, being basic, form acid addition salts with pharmaceutically acceptable acids such as hydrochloric, hydrobromic, acetic, sulfuric, fumaric, tartaric, malic, malonic, succinic, maleic, hexamic, etc. These salts, prepared by conventional methods well-known to the art, are equivalent to the free bases and are considered part of the present invention.

The compounds of the invention are antiparasitic and antibacterial agents. They are particularly active against the protozoan *Trichomonas foetus* and the Salmonella bacteria. They also have considerably reduced toxicity relative to the corresponding nitrofuran compounds. The principal compound of the invention is 3-(5-nitro-2-thenylideneamino)-5 - morpholinomethyl-2-oxazolidinone. This compound, when administered orally or subcutaneously to mice infected with a lethal *Trichomonas foetus* infection at dosages of 12.5 to 250 mg./kg./day, resulted in 60–100% survival. Per os administration of the compound showed 100% survival of mice treated with 400 mg./kg., whereas administration of 400 mg./kg. of the corresponding nitrofuran compound resulted in survival of none of the animals. The unexpectedly high antitrichomonal activity of the compounds of the invention, in conjunction with their markedly reduced toxicity, results in a highly favorable therapeutic ratio which is the distinguishing feature of the present invention.

The compounds are formulated in the conventional manner for use internally or topically.

The following examples are intended to illustrate the preparation of the compounds of the invention, but are not intended to limit the scope thereof.

EXAMPLE 1

*3-(5-nitro-2-thenylideneamino)-5-morpholinomethyl-2-oxazolidinone*

A solution of 6.3 g. of 5-nitro-2-thiophenecarboxaldehyde in 50 ml. of ethanol is added in one portion to a stirred solution of 8.1 g. of 3-amino-5-morpholinohmethyl-2-oxazolidinone in 120 ml. of ethanol. The resulting precipitate is filtered off and dissolved in dilute hydrochloric acid. After filtration, the acidic filtrate is made basic with 5% aqueous sodium carbonate. The resulting product is filtered off and recrystallized from acetonitrile-ethanol to give the pure title product, M.P. 203–204°.

*Analysis.*—Calc'd for $C_{13}H_{16}N_4O_5S$: C, 45.87; H, 4.74; N, 16.46; S, 9.42%. Found: C, 46.17; H, 4.95; N, 16.25; S, 9.35%.

A hydrochloric salt is prepared by suspending the basic product in alcohol and adding conc. hydrochloric acid. The resulting precipitate is filtered off and recrystallized.

EXAMPLE 2

When the following 3-amino-5-tert-aminomethyl-2-oxazolidinones are condensed with 5-nitro-2-thiophenecarboxaldehyde as described in Example 1, the corresponding listed products are obtained.

*Oxazolidinones*

3-amino-5-piperidinomethyl-2-oxazolidinone
3-amino-5-pyrrolidinomethyl-2-oxazolidinone
3-amino-5-diethylaminomethyl-2-oxazolidinone
3-amino-5-methylethylaminomethyl-2-oxazolidinone
3-amino-5-dimethylaminomethyl-2-oxazolidinone
3-amino-5-dipropylaminomethyl-2-oxazolidinone
3-amino-5-hexamethyleneiminomethyl-2-oxazolidinone
3-amino-5-(3-azabicyclo[3.2.2]non-3-ylmethyl)-2-oxazolidinone
3-(5-nitro-2-thenylideneamino)-5-piperidinomethyl-2-oxazolidinone
3-(5-nitro-2-thenylideneamino)-5-pyrrolidinomethyl-2-oxazolidinone
3-(5-nitro-2-thenylideneamino)-5-diethylaminomethyl-2-oxazolidinone
3-(5-nitro-2-thenylideneamino)-5-methylethylaminomethyl-2-oxazolidinone
3-(5-nitro-2-thenylideneamino)-5-dimethylaminomethyl-2-oxazolidinone
3-(5-nitro-2-thenylideneamino)-5-dipropylaminomethyl-2-oxazolidinone
3-(5-nitro-2-thenylideneamino)-5-hexamethyleneiminomethyl-2-oxazolidinone
3-(5-nitro-2-thenylideneamino)-5-(3-azabicyclo[3.2.2]non-3-ylmethyl)-2-oxazolidinone.

I claim:
1. A compound of the formula

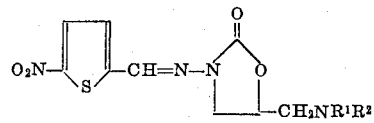

in which $NR^1R^2$ is morpholino, hexamethyleneimino, heptamethyleneimino, 4-methylpiperazino, or 3-azabicyclo[3.2.2]non-3-yl.

2. A compound as claimed in claim 1 in which $NR^1R^2$ is morpholino.

(References on following page)

References Cited by the Examiner

UNITED STATES PATENTS 3,151,110  9/1964  Kodama et al. _____ 260—240

FOREIGN PATENTS 843,602  8/1960  Great Britain.
843,834  8/1960  Great Britain.

OTHER REFERENCES

Smith et al.: J. Med. Pharm. Chem. vol. 1, pages 528–529 (1959).

Giorlando et al.: Am. J. Obst. & Gynec. vol. 76, pages 666–669 (1958).

JOHN D. RANDOLPH, *Primary Examiner.*